United States Patent

Nell

[15] 3,654,684
[45] Apr. 11, 1972

[54] METHOD OF MAKING A BEARING FOR STRUCTURAL ELEMENTS

[72] Inventor: Hans Alfred Nell, Klippe 17, Langenberg, Germany

[22] Filed: Mar. 3, 1970

[21] Appl. No.: 16,005

[30] Foreign Application Priority Data

Mar. 3, 1969 Germany.....................P 19 10 727.8

[52] U.S. Cl.....................29/149.5 NM, 29/155 R, 29/404, 29/434
[51] Int. Cl.................B23p 11/00, B21d 53/10, B23q 17/00
[58] Field of Search........29/149.5, 149.5 NM, 404, 148.4 A, 29/148.4, 434, 155 R

[56] References Cited

UNITED STATES PATENTS

| | | | |
|---|---|---|---|
| 2,675,276 | 4/1954 | Daugherty | 29/149.5 NM |
| 3,115,696 | 12/1963 | Evans | 29/149.5 NM |
| 3,155,441 | 11/1964 | Bemmann | 308/241 |
| 3,195,221 | 7/1965 | Martin et al. | 29/149.5 NM |
| 3,251,117 | 5/1966 | Maynard et al. | 29/404 X |
| 3,387,985 | 6/1968 | Huber | 29/148.4 X |

*Primary Examiner*—Thomas H. Eager
*Attorney*—Michael S. Striker

[57] ABSTRACT

A bearing for structural elements is made by first providing at least two foil components each of which has a free surface which in use of the bearing is to slidingly engage the free surface of the respective other component. Thereupon the free surfaces are placed into face-to-face abutment and the two components are subjected to such forces and movements as at least approximate those which the finished bearing is expected to encounter in actual use, for instance by advancing the foil components between two pressure rollers rotating in mutually opposite directions. In so doing the bearing has imparted thereto a predetermined at least substantially constant coefficient of friction before it is subjected to actual use, and which coefficient of friction it could otherwise only attain over a period of time in actual use. actual use.

8 Claims, 5 Drawing Figures

METHOD OF MAKING A BEARING FOR STRUCTURAL ELEMENTS

BACKGROUND OF THE INVENTION

The present invention relates generally to bearings for structural elements, and more particularly to a method of making such bearings. Still more specifically the invention relates to a method of making bearings for structural elements which bearings have a substantially constant coefficient of friction.

It is known that structural elements, such as supports, walls or the like in buildings and other structures are frequently provided with bearings, or more particularly with slide bearings which are interposed between the respective structural element and a support, for instance a sill on which a wall is erected. These known slide bearings with which those skilled in the art are conversant, have a coefficient of friction which, as the first load changes and concomitant relative movement of the structural elements between which the bearing is interposed take place, is frequently so high that undesired problems occur, such as damage in form of cracks or the like in structural elements with which the bearing cooperates. In other words, there is the danger that the structural elements are damaged as a result of relative movements before the sliding bearing interposed between and contacting such structural elements achieves after a certain period of time the necessary low coefficient of friction which guarantees that the structural elements can perform the permissible relative movements without such damage.

SUMMARY OF THE INVENTION

It is, accordingly, an object of the present invention to overcome these disadvantages.

More particularly, it is an object of the present invention to provide a method of making a bearing for structural elements which is not possessed of these disadvantages.

Still more specifically it is an object of the present invention to provide a method of making such a bearing for structural elements which has prior to its actual use a coefficient of friction which is substantially constant or, expressed differently, which has already a coefficient of friction at least approximating that which it could otherwise attain only over a period of time in actual use.

In pursuance of the above objects, and others which will become apparent hereafter, one feature of the invention resides in a method of making a bearing for structural elements which, briefly stated, comprises the first step of making a bearing having at least two components each of which is provided with a free surface which in use of the bearing is to slidingly engage the free surface of the respective other component. The second step involves placing the free surfaces into face-to-face abutment with one another. Thereupon, the components are subjected to such forces and movements as at least approximate those which the finished bearing is expected to encounter in actual use. In this manner there is imparted to the bearing an at least substantially constant coefficient of friction approximating the coefficient of friction which it would normally attain after undergoing actual use for a certain period of time. A bearing constructed in this manner and interposed between two structural elements which are to be permitted to perform certain relative movements will not cause the aforementioned difficulties.

According to the invention it is also possible to pass a foil of friction-promoting synthetic plastic material between and in pressure contact with at least cooperating pressure rollers one of which is driven in the direction of movement of the coil whereas the other member is driven in the direction opposite the movement of the foil. In this manner that surface which comes in contact with the roller driven in the direction opposite the movement of the foil can for instance be prepared in accordance with certain desired operating conditions. This has the advantage that bearings of the type under discussion can be produced in series of desired size, rather than individually.

According to a further concept of the invention it is advantageous—particularly with respect to bearings of the type under discussion which are to be subjected to particularly critical load conditions—that the abutting free surfaces be subjected to sliding or rotating displacement with reference to one another while they are pressed against each other. In this manner the two surfaces can be subjected to such forces and movements that the bearing will have an at least substantially constant coefficient of friction when it is finished and before it is subjected to actual use.

It may be advantageous if the material of at least one of the components has, at least in the region of its free surface, a degree of hardness which is lesser than that of the other component. One of the surfaces may advantageously consist of synthetic plastic material.

It is also possible to coat the free surfaces during the step of subjecting the components to such forces and movements as approximate those which the finished bearing is expected to encounter in actual use, with a friction-promoting—that is a low coefficient of friction—material, such as tetrafluorethylene, graphite, silicone or an analogous material.

In addition it is possible to so subject the two components to pressure that the material of one of the components at the interface of the two surfaces will flow under the influence of this pressure, whereby any unevennesses in the two surfaces will be smoothed by an even distribution of the flowing material over the two surfaces, so that they are smooth and a still lower coefficient of friction is attained than would otherwise be possible.

The novel features which are considered as characteristic for the invention are set forth in particular in the appended claims. The invention, itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
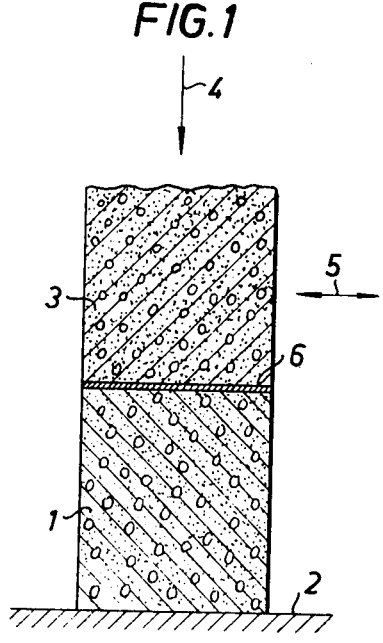
FIG. 1 is a diagrammatic fragmentary elevation illustrating structural elements of the type with which the bearing according to the present invention is to be used.

Discussing now the drawing in detail, and firstly FIG. 1 thereof, it will be seen that reference numeral 1 identifies a first structural element, for instance a sill, which is supported on and in suitable manner connected with a support 2, for instance a foundation of a structure. A second structural element 3 is disposed on and rests upon the first structural element 1. The element 3 may be a wall, and both have been illustrated as masonry, but could also be of different composition. Reference numeral 6 identifies the interface between the structural elements 1 and 3, that is the face at which the two abut one another. The arrow 4 identifies the vertical load acting upon the elements 3 and 1, for instance the weight of the element 3 which rests upon and acts upon the element 1. Reference numeral 5 identifies the double-headed arrow which designates by way of example directions of relative movement of the elements 1 and 3, and in FIG. 1 of course it will be appreciated that such movement would ordinarily be performed only by the element 3 with reference to the element 1.

Figure 2:
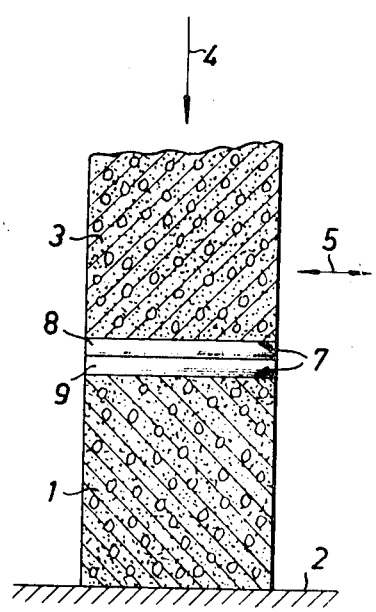
FIG. 2 is a view similar to FIG. 1 illustrating the structural elements with a bearing made according to the present invention interposed between them.

FIG. 2 illustrates how conventionally a slide bearing is interposed between the two structural elements 1 and 3. This slide bearing is of the type constructed in accordance with the present invention. Like reference numerals identify like elements. The slide bearing is identified with reference numeral 7 in FIG. 2 and will be seen to be composed of two components 8 and 9 which are interposed between the structural elements 1 and 3. It should be pointed out, parenthetically, that of course in place of the two elements 1 and 3 there could be a single element—a composite of the elements 1 and 3—and the bearing 7 could be interposed between this single element and the support 2.

Figure 3:
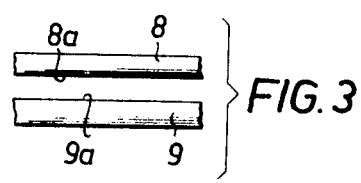
FIG. 3 is a fragmentary diagrammatic exploded detail view illustrating the bearing of FIG. 2.

FIG. 3 shows details of the bearing 7 of FIG. 2. Specifically, each of the components 8 and 9—whose configuration is immaterial for an understanding of the invention—has an exposed free surface 8a and 9a, respectively, and while the components 8 and 9 have been illustrated as being spaced apart in FIG. 3 for better understanding, it will be appreciated that when the bearing 7 is in actual use as shown in FIG. 2, the surfaces 8a and 9a will be in face-to-face abutment with each other. In other words, the faces 8a and 9a will slide one upon the other if relative movement occurs between the elements 1 and 3.

The bearing 7 is produced in accordance with the present invention by making the elements 8 and 9, placing their surfaces into face-to-face abutment and then subjecting the components 8 and 9 to forces and movements which at least approximate those which the bearing 7 will encounter when in actual use as illustrated in FIG. 2. In other words, forces such as indicated by the arrow 4 and by the arrow 5 are applied to the bearing composed of the components 8 and 9, and the finished bearing will then have a coefficient of friction which is at least substantially constant and which at least approximates that which it could attain in actual use—and not produced in accordance with the present invention—only over a period of time if interposed between the elements 1 and 3.

Figure 4:
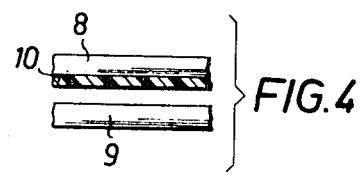
FIG. 4 illustrates a further embodiment in a view analogous to FIG. 3.

FIG. 4 shows an embodiment of the invention where again the components 8 and 9 are provided to constitute the bearing 7. Here, however, at least one of the surfaces—in the illustrated embodiment the surface 8a of the component 8—a friction-reducing material, that is material which has a low coefficient of friction. This coating is identified with reference numeral 10 and may be of a suitable material, such as tetrafluoroethylene (commercially known under the trade name Teflon), graphite, silicone or the like. The coating 10 may be in form of a foil but it may also be applied—for instance in form of a spray or the like—during the actual preparation of the bearing, that is while the components 8 and 9 are subjected to such forces and movements which at least approximate the forces and movements which the finished bearing is expected to encounter in actual use.

Figure 5:
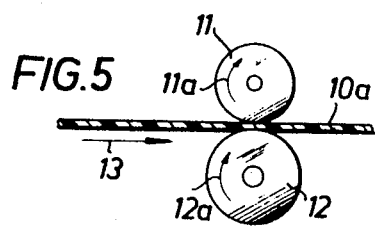
FIG. 5 is a diagrammatic detail view illustrating still a further embodiment of the invention.

FIG. 5, finally, shows a manner in which a foil 10a of synthetic plastic material having a low coefficient of friction can be prepared. This foil 10a may for instance correspond to the coating 10, although as mentioned with respect to FIG. 4 the coating 10 may also be applied as a spray or the like. If the foil 10a is involved, however, then it may be advanced in the direction of the arrow 13 between and in pressure contact with the two cooperating pressure rollers 11 and 12. Of these, one (namely the roller 12) rotates in the direction of advancement of the foil 10a as indicated by the arrow 12a. The other roller 11, however, rotates in the direction oppositely the advancement of the foil 10a, as identified with the arrow 11a. The result is that the surface of the foil 10a which is contacted by the roller 11—that is the roller which rotates in the direction oppositely the direction of advancement 13 of the foil 10a—can be prepared in suitable manner, for instance in accordance with certain desired operating conditions for the finished bearing.

It will be understood that each of the elements described above, or two or more together, may also find a useful application in other types of applications differing from the types described above.

While the invention has been illustrated and described as embodied in a method of making a bearing for structural elements, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. A method of making a bearing for structural elements of buildings, bridges and the like, comprising the first step of making a bearing having at least two components each having a free surface which in use of the bearing is to slidingly engage the free surface of the respective other component, at least one of said components being constituted at least at the surface thereof by a foil of synthetic plastic material, and said components together having a first coefficient of friction; the second step of placing said free surfaces into face-to-face abutment with one another and accommodating said components between relatively displaceable pressure-exerting instrumentalities; and the third step of subjecting said components by engagement with said instrumentalities to pressures and relative movements which at least approximate those the finished bearing is expected to encounter in actual use, whereby to impart to said bearing an at least substantially constant second lower coefficient of friction prior to its actual use.

2. A method as defined in claim 1, wherein said third step comprises sliding the components with reference to one another.

3. A method as defined in claim 1, wherein said third step comprises turning said components with reference to one another.

4. A method as defined in claim 1, wherein at least one of said components has at least in the region of said free surface thereof a degree of hardness which is smaller than that of the other component.

5. A method as defined in claim 1; and further comprising the step of coating at least one of said free surfaces with a substance having a low coefficient of friction.

6. A method as defined in claim 5, wherein the step of coating is carried out during displacement of said components with reference to one another.

7. A method as defined in claim 1, wherein said third step comprises exerting upon said components a pressure requisite for causing the material of at least one of said components to flow at the interface between said free surfaces.

8. A method as defined in claim 1; and further comprising the step of preparing said foil by advancing the same in a predetermined direction between and in pressure-contact with a pair of cooperating pressure rollers one of which rotates in said predetermined direction and the other of which rotates oppositely to said predetermined direction.

* * * * *